(12) United States Patent
Shilovitsky

(10) Patent No.: US 11,037,103 B1
(45) Date of Patent: Jun. 15, 2021

(54) SYSTEM AND METHOD FOR COLLABORATIVE BILL OF MATERIALS MANAGEMENT

(71) Applicant: Oleg Shilovitsky, Newton, MA (US)

(72) Inventor: Oleg Shilovitsky, Newton, MA (US)

(73) Assignee: Newman Cloud, Inc., Newton, MA (US)

( * ) Notice: Subject to any disclaimer, the term of this patent is extended or adjusted under 35 U.S.C. 154(b) by 500 days.

(21) Appl. No.: 15/460,803

(22) Filed: Mar. 16, 2017

Related U.S. Application Data

(60) Provisional application No. 62/309,314, filed on Mar. 16, 2016.

(51) Int. Cl.

| | |
|---|---|
| *G06F 15/16* | (2006.01) |
| *G06Q 10/08* | (2012.01) |
| *G06F 16/00* | (2019.01) |
| *G06Q 10/10* | (2012.01) |
| *H04L 29/06* | (2006.01) |
| *G06F 21/60* | (2013.01) |
| *G06F 21/62* | (2013.01) |

(52) U.S. Cl.
CPC ......... *G06Q 10/103* (2013.01); *G06F 21/604* (2013.01); *G06F 21/6227* (2013.01); *G06Q 10/0875* (2013.01); *H04L 63/102* (2013.01)

(58) Field of Classification Search
CPC .............. G06Q 10/103; G06Q 10/0875; G06F 21/604; G06F 21/6227; H04L 63/102
See application file for complete search history.

(56) References Cited

U.S. PATENT DOCUMENTS

| | | | |
|---|---|---|---|
| 6,564,246 B1* | 5/2003 | Varma | G06Q 10/10 709/205 |
| 7,558,793 B1* | 7/2009 | Topolovac | G06Q 10/0875 |
| 7,610,312 B1* | 10/2009 | Topolovac | G06Q 10/087 |
| 7,801,916 B1* | 9/2010 | Topolovac | G06Q 10/0875 707/783 |
| 8,082,301 B2* | 12/2011 | Ahlgren | G06F 21/6218 709/204 |
| 8,103,694 B1* | 1/2012 | Topolovac | G06Q 10/087 707/786 |
| 2002/0055886 A1* | 5/2002 | Hinckley | G06Q 10/087 705/26.1 |
| 2003/0009410 A1* | 1/2003 | Ramankutty | G06Q 40/04 705/37 |

(Continued)

*Primary Examiner* — Talia F Crawley
(74) *Attorney, Agent, or Firm* — Ascentage Patent Law, LLC; Travis Lee Johnson

(57) ABSTRACT

The present disclosure relates to a system and method for collaborative Bill of Materials (BOM) management, said system comprising a user rights based BOM editing module that enables a first user to, based on rights assigned to the first user, edit the BOM, wherein the BOM comprises a plurality of structured fields, each of the plurality of structured fields having at least one defined property. The system of the present invention further comprises a user rights based BOM edit update module that updates at least a second user of the editing done by the first user based on rights assigned to the second user, wherein the rights of the second user are at least for the sections or fields edited by the first user; and a user update based BOM version management module that makes a version of the BOM based on the editing done by the first user.

19 Claims, 15 Drawing Sheets

(56) References Cited

U.S. PATENT DOCUMENTS

| | | | |
|---|---|---|---|
| 2004/0243491 A1 | 12/2004 | Hsiang | |
| 2006/0190364 A1* | 8/2006 | Bizovi | G06F 30/00 |
| | | | 705/29 |
| 2007/0073679 A1* | 3/2007 | Fu | G06Q 10/06 |
| 2008/0010328 A1* | 1/2008 | Moeller | G06F 16/24528 |
| | | | 708/200 |
| 2009/0320035 A1* | 12/2009 | Ahlgren | G06F 9/468 |
| | | | 718/104 |
| 2010/0030767 A1* | 2/2010 | Kim | G06F 16/332 |
| | | | 707/777 |
| 2010/0058198 A1* | 3/2010 | Chong | G06Q 10/10 |
| | | | 715/751 |
| 2011/0112679 A1* | 5/2011 | Srinivasan | G06Q 10/06 |
| | | | 700/107 |
| 2012/0278787 A1* | 11/2012 | Chong | G06F 8/51 |
| | | | 717/104 |
| 2014/0364985 A1* | 12/2014 | Tiwari | G06F 30/00 |
| | | | 700/107 |
| 2015/0262124 A1* | 9/2015 | Martinez-Ablanedo | G06F 16/00 |
| | | | 705/29 |
| 2015/0379466 A1* | 12/2015 | Taguchi | G06Q 10/08 |
| | | | 705/29 |
| 2016/0189081 A1* | 6/2016 | Gajdzinski | G06Q 10/06393 |
| | | | 705/7.39 |

* cited by examiner

```
SHARE SETTING FOR....

<BoM / Doc Name>            This BoM is Used Owned by < User Name>

✉  | USER NAME / EMAIL 1 |  CAN EDIT  ▼ |              X
  ✉  | USER NAME / EMAIL 2 |  CAN READ  ▼ |              X
  ✉  | USER NAME / EMAIL 3 |  CAN EDIT  ▼ |              X

| EMAIL (S)           |  SELECT OPTION ▼ |   ADD
                              CAN EDIT
                              CAN VIEW
                              CAN COMMENT (TBD)

⊝  SHARE WITH SUPPORT TEAM          UPDATE        CLOSE
```

HISTORY OF CHANGES....

> LATEST STATE (CURRENT DATE / TIME) ▼

OPERATION BB DONE BY USER NAME AT DATE/TIME

OPERATION QQ DONE BY USER NAME AT DATE//TIME

> REVISION 5 - (CURRENT NOTE) DATE/TIME

OPERATION Y DONE BY USER NAME AT DATE//TIME

OPERATION Z DONE BY USER NAME AT DATE//TIME ▼

OPERATION A DONE BY USER NAME AT DATE//TIME ▼

OPERATION B DONE BY USER NAME AT DATE//TIME ▼

(LOAD MORE – LOAD N CHANGES) ▼

| EXPAND |
| COMPARE COMING |

> REVISION 4 - (CURRENT NOTE) DATE/TIME

> REVISION 3 - (CURRENT NOTE) DATE/TIME

> REVISION 2 - (CURRENT NOTE) DATE/TIME

> REVISION 1 - (CURRENT NOTE) DATE/TIME

[ LOAD MORE... ] [ CLOSE ]

<Return to Dashboard
Part Number: /Not assigned Name: Multi-purpose Pump-Main-Boat Pump Assembly-1

| Latest State | Save new revision | History | ☐ Released |

⊕ Item  ⊕ Property  ⊖ Delete   ≡≡≡   ↶ Undo  ↷ Redo   ⬇ Export ▶   ⚙ Tools ▶

510 — User_1 ▶  ⓘ  Set Inventories  Share

| # | Name | Images | Type | Quantity | Description | Composed of Part Number | Where Used | Rev... | State | Material | Link to CAD | Page Count | Balloon Nu... | BOM View |
|---|---|---|---|---|---|---|---|---|---|---|---|---|---|---|
| 1 | Pump 1_2F-L95xg | | Part | 1 | Pump body | F-L95x-g | | V | In_Progress | | Boat Pump PS | 1 | | Drawing, Engineering |
| 2 | Emb 1_2k | | Part | 1 | Impeller | Imp 1-2-KK | | V | In_Progress | Stainless Steel 17-4 | Boat Pump PS | 1 | | Drawing, Engineering |
| 3 | Laving D85-55 | | Part | 1 | Gasket/Spacer | D-85-55X | | V | In_Progress | Stainless Steel 17-4 | Boat Pump PS | 1 | | Drawing, Engineering |
| 4 | Cap D-85 | | Part | 1 | Pump Cap2 | D-85 | | V | In_Progress | | Boat Pump PS | 1 | | Drawing, Engineering |
| 5 | Shaft 1_2 F-L95(L-104) | | Part | 1 | Shaft | L-104 | | V | In_Progress | Stainless Steel 17-4 | Boat Pump PS | 1 | | Drawing, Engineering |
| 6 | Radial Ball Bearing_68_DIN (DIN 625 – 6203-1) | | Part | 1 | 33-14-8 | 6203-02-01T07:00:00.000Z | | R1 | In_Progress | Stainless Steel 17-4 | Boat Pump PS | 1 | | Drawing, Engineering |
| 7 | Seal 33-14-8 | | Part | 1 | Seal | 33-14-8 | | R1 | In_Progress | Silicon Rubber | Boat Pump PS | 1 | | Drawing, Engineering |
| 8 | Radial Ball Bearing_68_DIN (DIN 625 – 6203-2) | | Part | 1 | Radial Bearing | 6203-01-01T07:00:00.000Z | | R1 | In_Progress | Stainless Steel 17-4 | Boat Pump PS | 1 | | Drawing, Engineering |
| 9 | Circlip 2 Large | | Part | 1 | Circlip 1.25 | HDWRE CC 1.25 | | R1 | In_Progress | Aluminum - 2024 | Boat Pump PS | 1 | | Drawing, Engineering |
| 10 | Pan cross head_aj(CR-PHMS 0.164-36x0.75-N | | Part | 5 | Pan Head Screw | HDWRE PHS M6x12 | | R1 | In_Progress | | Boat Pump PS | 1 | | Drawing, Engineering |
| 11 | Socket Head Cap Screw_DIN(DIN 912 M6 x 12 ... 12N) | | Part | 5 | Socket Head Screw M6x12 | HDWRE SHCS M6x12 | | R1 | In_Progress | | Boat Pump PS | 1 | | Drawing, Engineering |

FIG. 5A

| | Name | Thumbnail Images | Type | Quantity | Description | Part Number | Revision | State | Material | Link to CAD | Page Numb. | Balloon Numb. | BOM View |
|---|---|---|---|---|---|---|---|---|---|---|---|---|---|
| 1 | Pump 1_2F-L95xg | | Part | 1 | Pump body | F-L95-g | V | In_Progress | | Boat Pump PS | 1 | | Drawing, Engineering |
| 2 | Emb 1_2k | | Part | | | | | gress | Stainless Steel 17-4 | Boat Pump PS | 1 | | Drawing, Engineering |
| 3 | Laving DB5-55 | | Part | | | | | gress | Stainless Steel 17-4 | Boat Pump PS | 1 | | Drawing, Engineering |
| 4 | Cap D-85 | | Part | | | | | gress | | Boat Pump PS | 1 | | Drawing, Engineering |
| 5 | Shaft 1_2 F-L95(L-104) | | Part | | | | | gress | Stainless Steel 17-4 | Boat Pump PS | 1 | | Drawing, Engineering |
| 6 | Radial Ball Bearing_68_DIN (DIN 625 – 6203-1) | | Part | | | | | gress | Stainless Steel 17-4 | Boat Pump PS | 1 | | Drawing, Engineering |
| 7 | Seal 33-14-8 | | Part | | | | | gress | Silicon Rubber | Boat Pump PS | 1 | | Drawing, Engineering |
| 8 | Radial Ball Bearing_68_DIN (DIN 625 – 6203-2) | | Part | | | | | gress | Stainless Steel 17-4 | Boat Pump PS | 1 | | Drawing, Engineering |
| 9 | Circlip 2 Large | | Part | 1 | Circlip 1.25 | HDWRE CC 1.25 | R1 | In_Progress | Aluminum - 2024 | Boat Pump PS | 1 | | Drawing, Engineering |
| 10 | Pan cross head_ai(CR-PHMS 0.164-36x0.75x0.75-N | | Part | 5 | Pan Head Screw | HDWRE PHS M6x12 | R1 | In_Progress | | Boat Pump PS | 1 | | Drawing, Engineering |
| 11 | Socket Head Cap Screw_DIN(DIN 912 M6 x 12 ... 12N) | | Part | 5 | Socket Head Screw M6x12 | HDWRE SHCS M6x12 | R1 | In_Progress | | Boat Pump PS | 1 | | Drawing, Engineering |

FIG. 5B

| | Name | Thumbnail Images | Type | Quantity | Description | Part Number | Revision | State | Material | Link to CAD | Page Number | BOM View |
|---|---|---|---|---|---|---|---|---|---|---|---|---|
| 1 | Pump_1_2F-L95xg | | Part | 1 | Pump body | F-L95x-g | V | In_Progress | | Boat Pump PS | 1 | Drawing, Engineering |
| 2 | Emb_1_2k | | Part | 1 | Impeller | Imp 1-2-KK | V | In_Progress | Stainless Steel 17-4 | Boat Pump PS | 1 | Drawing, Engineering |
| 3 | Laying D85-55 | | Part | 1 | Gasket/Spacer | D-85-55X | V | In_Progress | Stainless Steel 17-4 | Boat Pump PS | 1 | Drawing, Engineering |
| 4 | Cap D-85 | | Part | 1 | Pump Cap2 | D-85 | V | In_Progress | Stainless Steel 17-4 | Boat Pump PS | 1 | Drawing, Engineering |
| 5 | Shaft_1_2 F-L95(L-104) | | Part | 1 | Shaft | L-104 | V | In_Progress | Stainless Steel 17-4 | Boat Pump PS | 1 | Drawing, Engineering |
| 6 | Radial Ball Bearing_68_DIN (DIN 625 – 6203-1) | | Part | 1 | 33-14-8 | 6203-02-01T07:00:00.000Z | R1 | In_Progress | Stainless Steel 17-4 | Boat Pump PS | 1 | Drawing, Engineering |
| 7 | Seal 33-14-8 | | Part | 1 | Seal | 33-14-8 | R1 | In_Progress | Silicon Rubber | Boat Pump PS | 1 | Drawing, Engineering |
| 8 | Radial Ball Bearing_68_DIN (DIN 625 – 6203-2) | | Part | 1 | Radial Bearing | 6203-01-01T07:00:00.000Z | R1 | In_Progress | Stainless Steel 17-4 | Boat Pump PS | 1 | Drawing, Engineering |
| 9 | Circlip 2 Large | | Part | 1 | Circlip 1.25 | HDWRE CC 1.25 | R1 | In_Progress | Aluminum - 2024 | Boat Pump PS | 1 | Drawing, Engineering |
| 10 | Pan cross head_aj(CR-PHMS 0.164-36x0.75x0.75-N | | Part | 5 | Pan Head Screw | HDWRE PHS M6x12 | R1 | In_Progress | | Boat Pump PS | 1 | Drawing, Engineering |
| 11 | Socket Head Cap Screw_DIN(DIN 912 M6 x 12 … 12N) | | Part | 5 | Socket Head Screw M6x12 | HDWRE SHCS M6x12 | R1 | In_Progress | | Boat Pump PS | 1 | Drawing, Engineering |

<Return to Dashboard
Part Number: /Not assigned Name: Multi-purpose Pump-Main-Boat Pump Assembly-1

Latest State | Save new revision | History ☐ Released

⊕ Item  ⊕ Property  ⊖ Delete   ↶ Undo  ↷ Redo   ⤓ Export  ⚙ Tools                                                                                               ⓘ   User_1 ▼
                                                                                                                                                                 Set Inventories | Share User_1 (The Engineer (BOM Owner))

| | Name | Thumbnail Images | Type | Quantity | Description | Part Number | Revision | State | Material | Link to CAD | Page Number | Balloon Nu... | BOM View |
|---|---|---|---|---|---|---|---|---|---|---|---|---|---|
| 1 | Pump_1_2F-L95xg | | Part | 1 | Pump body | F-L95x-g | V | In_Progress | | Boat Pump.PS | 1 | | Drawing, Engineering |
| 2 | Emb_1_2k | | Part | 1 | Impeller | Imp 1-2-KK | V | In_Progress | Stainless Steel 17-4 | Boat Pump.PS | 1 | | Drawing, Engineering |
| 3 | Laxing D85-55 | | Part | 1 | Gasket/Spacer | D-85-55 | V | In_Progress | Stainless Steel 17-4 | Boat Pump.PS | 1 | | Drawing, Engineering |
| 4 | Cap D-85 | | Part | 1 | Pump Cap2 | D-85 | V | In_Progress | | Boat Pump.PS | 1 | | Drawing, Engineering |
| 5 | Shaft_1_2_F-L95(L-104) | | Part | 1 | Shaft | L-104 | V | In_Progress | Stainless Steel 17-4 | Boat Pump.PS | 1 | | Drawing, Engineering |
| 6 | Radial Ball Bearing_68_DIN (DIN 625 – 6203-1) | | Part | 1 | 33-14-8 | 6203-02-01T07:00:00.000Z | R1 | In_Progress | Stainless Steel 17-4 | Boat Pump.PS | 1 | | Drawing, Engineering |
| 7 | Seal 33-14-8 | | Part | 1 | Seal | 33-14-8 | R1 | In_Progress | Silicon Rubber | Boat Pump.PS | 1 | | Drawing, Engineering |
| 8 | Radial Ball Bearing_68_DIN (DIN 625 – 6203-2) | | Part | 1 | Radial Bearing | 6203-01-01T07:00:00.000Z | R1 | In_Progress | Stainless Steel 17-4 | Boat Pump.PS | 1 | | Drawing, Engineering |
| 9 | Circlip 2 Large | | Part | 1 | Circlip 1.25 | HDWRE CC 1.25 | R1 | In_Progress | Aluminum - 2024 | Boat Pump.PS | 1 | | Drawing, Engineering |
| 10 | Pan cross head_aj(CR-PHMS 0.164-36x0.75-N | | Part | 5 | Pan Head Screw | HDWRE PHS M6x12 | R1 | In_Progress | | Boat Pump.PS | 1 | | Drawing, Engineering |
| 11 | Socket Head Cap Screw_DIN(DIN 912 M6 x 12 ... 12N) | | Part | 5 | Socket Head Screw M6x12 | HDWRE SHCS M6x12 | R1 | In_Progress | | Boat Pump.PS | 1 | | Drawing, Engineering |

FIG. 5D

SYSTEM AND METHOD FOR COLLABORATIVE BILL OF MATERIALS MANAGEMENT

PRIORITY CLAIM

This application claims the benefit of priority to U.S. Provisional Patent Application No. 62/309,314 filed Mar. 16, 2016, the contents of which is incorporated herein by reference in its entirety.

FIELD OF THE INVENTION

The present disclosure relates to a collaborative bill of materials (BOM) management. More particularly, the present disclosure relates to creation, entry, editing, and version control of a BOM by one or more users at a common platform based on rights of said one or more users.

BACKGROUND

The following description includes information that may be useful in understanding the present invention. It is not an admission that any of the information provided herein is prior art or relevant to the presently claimed invention, or that any publication specifically or implicitly referenced is prior art.

In the course of manufacturing products, information about each component or sub-product in the way of a Bill of Materials (BOMs) should be provided. This information is generally created by multiple actors or users (e.g. designers, engineers, manufacturing planners, supply chain and sourcing managers and others). Bills of Materials are used extensively in the manufacturing process to assist with material requirements, and to detail the exact parts, formula, or recipe for a particular finished product. In order to speed up the pace at which consumer demands for a new or modified product are satisfied, manufacturers will typically utilize a Bill of Material system. The term "Bill of Material" or "BOM", as generally understood in the art and as used herein, refers to a detailed parts listing which can be organized into sub-lists and/or subassemblies. Specifically, a product may have many subassemblies, some or all of which may have further subassemblies. A Bill of Material may be a printed-out parts list having indentations where the indentations correspond to a depth of hierarchy for each product utilizing each subassembly. The Bill of Material traditionally has been utilized during the manufacturing process of an assembly to provide a reference for the relationship of each component to other components in the assembly. Once the Bill of Material is created, it can be used by a manufacturer in order to provide a benchmark to which production is compared for exact manufacturing instructions, particularly where component quantities and mixtures are critical. In either case, accuracy of the Bill of Material is critical for material requirements planning (MRP) and accurately projecting costs. Some systems extend the Bill of Materials by adding specific manufacturing details, scrap percentages and packaging/labeling methods. Most provide the ability to add routings to the Bill of Materials. Routings are often referred to as work centers or equipment areas. These routings are used to assist with scheduling the manufacturing processes, adding labor and equipment costs, and even adding start-up and overheads to the Bill of Materials. Thus, the Bill of Materials is an important part of many manufacturing processes.

In order to maintain a consistent Bill of Materials, correct information also needs to be managed in a manner so as to maintain the integrity of the following: list of parts, dependencies, correct revisions, effective dates and many other related parameters. Presently, the information managed by data management systems is configured to only allow a single user at a given time to make changes that can be later presented and displayed for other users to view. Some recognized challenges of such and other existing methods are that they often require complex editing mechanisms or protocols to coordinate work on people on the same Bill of Materials.

Even other generic collaborative spreadsheets have shortcomings for application in BOM, although while such sheets help in real time collaboration of edits in a sheet, they are not designed for efficiently creating, managing, and processing BOMs. For instance, such sheets lack structured fields with predefined properties and permissions, and therefore mandate users to manually create all the fields for any BOM. Also, due to lack of structured fields, such sheets cannot support multi-level BOMs. Even though they can be used to save edits made by one or more users, they do not enable users to save versions of the sheet in the form of, for instance, immutable historical snapshots, and therefore require users to manually go through all edits and find a particular desired version in order to restore a previous version. Furthermore, although such sheets support edit/view rights to be allocated to different users, these rights are applicable to the entire sheet and not to specific fields/sections of the sheet, which means that all the fields are visible to all users and data for specific fields cannot be hidden from other users.

Current manufacturing environment is highly distributed and requires coordination between different people, organizations, stakeholders, departments which are spread across locations and time zones, and therefore to maintain sequential and coordinated work on a BOM can require a great level of complexity and coordination. As such there exists a need in the art of an efficient system, architecture, and method that enables creation, management, and tracking of BOM across one or more users having different rights.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY

The present disclosure relates to management of bill of materials (BOM). More particularly, the present disclosure relates to creation, entry, editing, and version control of BOM by one or more users at a common platform based on rights of said one or more users on one or more sections/fields of the BOM.

In one aspect, the present disclosure relates to a system for management of a collaborative Bill of Materials (BOM), said system comprising: a non-transitory storage device having embodied therein one or more routines operable to create and manage the collaborative BOM that is editable by one or more users; and one or more processors coupled to the non-transitory storage device and operable to execute the one or more routines. In additional aspects of the present invention, the one or more routines can include a user rights based BOM editing module, which when executed by the one or more processors, enables a first user to, based on rights assigned to the first user, edit the BOM, wherein the BOM comprises a plurality of structured fields, each of the plurality of structured fields having at least one defined property; a user rights based BOM edit update module, which when executed by the one or more processors, updates at least a second user of the editing done by the first user based on rights assigned to the second user, wherein the rights of the second user are at least for the sections or fields edited by the first user; and a user update based BOM version management module, which when executed by the one or more processors, makes a version of the BOM based on the editing done by the first user.

In an aspect, rights can be assigned to enable the user to either edit or only view the BOM. In another aspect, the rights can be assigned for editing or viewing of one or more sections of the BOM, or for editing or viewing of at least one field of the BOM.

In another aspect of the present invention, the Collaborative BOM management system can further include a user update based data relationship maintenance module, which when executed by the one or more processors, can be performed automatically, based the editing done by the first user, then automatically assess any impact of the editing and subsequently maintain a data relationship across one or more sections and/or fields of the BOM based on the assessed impact. Being collaborative, the proposed system can also allow a third user to edit the BOM simultaneous along with the first user.

In an additional aspect, the system of the present disclosure can further include a BOM structured data based field creation module, which when executed by the one or more processors, enables at least one administrator to create the plurality of structured fields having corresponding properties for each field.

In another aspect, the system of the present disclosure can further include a user rights association module, which when executed by the one or more processors, enables an administrator to assign rights to one or more users for editing or viewing of one or more sections of the BOM, or for editing or viewing of at least one field of the BOM.

In yet another embodiment a multi-user collaborative Bill of Materials system comprises at least one remote database; at least one remote processing server, having at least one processor and at least one non-transitory computer-readable medium containing at least one executable set of computer instructions capable of generating a plurality of user profiles; wherein the at least one remote database and the at least one remote processing server are connected via a network. A plurality of user interface ports, which are each accessible by at least one of the plurality of user profiles, are able to communicate with the at least one remote processing server via the network. This enables a user-managed bill of materials having a plurality of fields to be generated by the at least one remote processing server based on input from a first user profile and a set of structural rules. The set of structural rules can be contained at least partially on the at least one non-transitory computer-readable medium of the at least one remote processing server. Each of the fields of the user-managed bill of materials has a user-selected property associated therewith, wherein the properties associated with each field in-part determine a location on the remote database for storing information associated with each field. By having pointers to the remote database as a result of the field properties, information associated with a given field can be both permanently stored in a database, or at least semi-permanently stored in a database while the user-managed bill of materials can be edited in real-time by multiple user profiles simultaneously.

In yet another aspect, the system of the present disclosure can further include a user activity history management module, which when executed by the one or more processors, manages user-level history of actions performed on the BOM by each user of the BOM.

The present disclosure also relates to a method comprising the steps of enabling a first user to, at a first computing device, based on rights assigned to the first user, edit the BOM, wherein the BOM comprises a plurality of structured fields, each of the plurality of structured fields having at least one defined property; updating at least a second user of the editing done by the first user based on rights assigned to the second user, wherein the rights of the second user are at least for the sections or fields edited by the first user; and making a version of the BOM based on the editing done by the first user.

In some aspects, rights can be assigned to a department or to an entity of which the first user forms part.

In some additional aspects, the plurality of structured fields can be selected from any of, or a combination of, part name, part usage, part quantity, part price, part image, part type, part description, part number, part unique identifier, revision, state, material, product that the part forms part of, manufacturer information, supplier parameters, and part attributes.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

FIGS. 2A and 2B illustrate exemplary aspects of how BOM can be structured in accordance with an embodiment of the present disclosure;

DETAILED DESCRIPTION OF DRAWINGS

Figure 1:
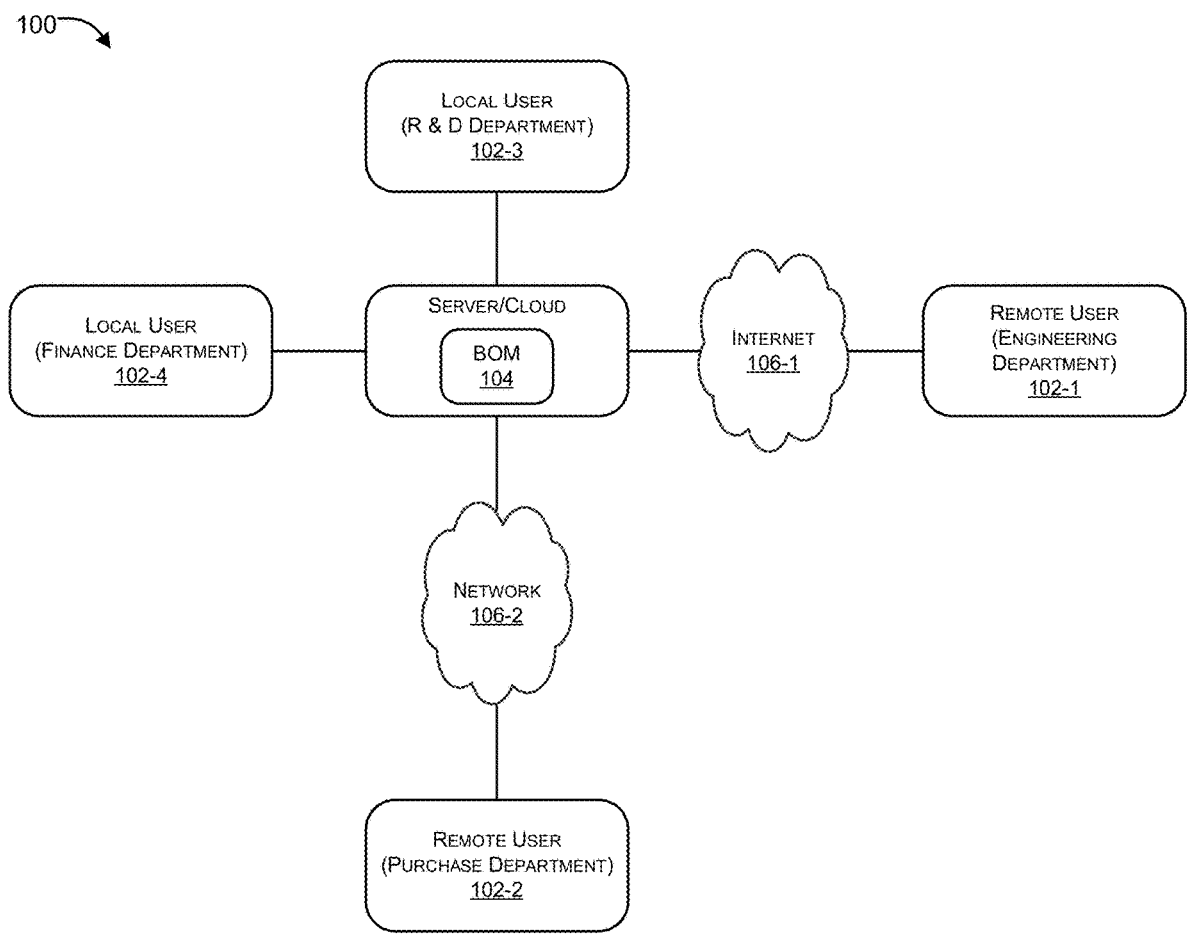
FIG. 1 illustrates an exemplary network architecture of creation and management of BOM in which aspects of the present disclosure can be implemented.

The present disclosure relates to a system for the management of a bill of materials (BOM). More particularly, the present disclosure relates to creation, entry, editing, and version control of BOM by one or more users at a common platform based on rights of said one or more users.

In an aspect, the present disclosure relates to a system for management of a collaborative Bill of Materials (BOM), said system comprising: a non-transitory storage device having embodied therein one or more routines operable to create and manage the collaborative BOM management system 100 that is editable by one or more users; and one or more processors coupled to the non-transitory storage device and operable to execute the one or more routines. In an aspect, the one or more routines can include a user rights based BOM editing module, which when executed by the one or more processors, enables a first user to, based on rights assigned to the first user, edit the BOM, wherein the BOM comprises a plurality of structured fields, each of the plurality of structured fields having at least one defined property; a user rights based BOM edit update module, which when executed by the one or more processors, updates at least a second user of the editing done by the first user based on rights assigned to the second user, wherein the rights of the second user are at least for the sections or fields edited by the first user; and a user update based BOM version management module, which when executed by the one or more processors, makes a version of the BOM based on the editing done by the first user.

In some embodiments, rights can be assigned to enable the user to either edit or only view the BOM. In another aspect, the rights can be assigned for editing or viewing of one or more sections of the BOM, or for editing or viewing of at least one field of the BOM.

In yet additional embodiments, the system of the present disclosure can further include a user update based data relationship maintenance module, which when executed by the one or more processors, automatically, based the editing done by the first user, assesses impact of the editing and maintains data relationship across one or more sections and/or fields of the BOM based on the assessed impact. Being collaborative, the proposed system also allows a third user to edit the BOM simultaneous to the first user.

In various additional embodiments, the system of the present disclosure can further include a BOM structured data based field creation module, which when executed by the one or more processors, enables at least one administrator to create the plurality of structured fields having corresponding properties for each field.

In another aspect, the system of the present disclosure can further include a user rights association module, which, when executed by the one or more processors, enables an administrator to assign rights to one or more users for editing or viewing of one or more sections of the BOM, or for editing or viewing of at least one field of the BOM.

In yet another aspect, the system of the present disclosure can further include a user activity history management module, which when executed by the one or more processors, manages user-level history of actions performed on the BOM by each user of the BOM.

The present disclosure further relates to a method comprising the steps of enabling a first user to, at a first computing device, based on rights assigned to the first user, edit the BOM, wherein the BOM comprises a plurality of structured fields, each of the plurality of structured fields having at least one defined property; updating at least a second user of the editing done by the first user based on rights assigned to the second user, wherein the rights of the second user are at least for the sections or fields edited by the first user; and making a version of the BOM based on the editing done by the first user.

In yet additional embodiments, rights can be assigned to a department or to an entity of which the first user forms part.

In another aspect, the plurality of structured fields can be selected from any or a combination of part name, part usage, part quantity, part price, part image, part type, part description, part number, part unique identifier, revision, state, material, product into which the part belongs, manufacturer information, supplier parameters, and part attributes.

Bills of materials (BOMs) are typically used to identify various parts, components and processes which are necessary to manufacture a particular product. They are useful for organizing, coordinating and tracking various steps to manufacture or otherwise create a product. BOMs are generally created by a BOM originator, such as an original equipment manufacturer (OEM). The OEM uses the BOM to coordinate with one or more suppliers, machinists, service providers, to obtain quotes for costs, quantities, delivery or lead times, and so forth. The suppliers can provide such information back to the OEM or the BOM of the OEM. This information is then collected, analyzed, and used to aide in generating purchase orders, transaction documents, and other kinds of information. This process may be referred to as "sourcing" a BOM, which can include multiple sourcing agents.

By way of example, an automobile or airplane is a product that requires thousands of parts and processes in order to be completed. A sourcing agent for a car, may be focused solely on a particular area of the car such as the transmission, engine cooling system, or computer system. Each of these various systems may have linking, complementary or shared components, and therefore it is important to understand effects each has and what affect changing or modifying a component can create. For instance, if a transmission sourcing agent is unable to obtain a particular component that interacts with the engine's cooling system a new equivalent or similar component might have to be obtained. This could require the adapting component of the engine cooling system to also need modification. Options could include: 1) sourcing a new engine cooling system component, 2) create a new component or solution by engineering, or 3) identify a bridging or coupling component. Each of these scenarios requires another user or group to engage in the process. In many instances, working on parallel solutions is the path forward. One can imagine that as multiple sourcing agents are looking to procure components, competitive pricing, and do so in an efficient manner, these processes again are done in parallel when possible and not sequentially unless necessary. As such, the present application seeks to provide solutions that enable parallel processing to occur in a collaborative BOM management system 100 (hereinafter also simply referred to as "system 100" hereinafter).

In an aspect, the present disclosure relates to a multi-user collaborative Bill of Materials (BOM) management system 100 comprising at least one remote database; at least one remote processing server having at least one processor and at least one non-transitory computer-readable medium containing at least one executable set of computer instructions capable of generating a plurality of user profiles, wherein the at least one remote database and the at least one remote processing server are connected via a network. The system can further include a plurality of user interface ports, each accessible by at least one of the plurality of user profiles, and wherein the interface ports communicate with the at least one remote processing server via the network. The system of the present disclosure can further include a user-managed BOM having a plurality of fields, the user-managed BOM being generated by the at least one remote processing server based on input from a first user profile and a set of structural rules contained at least partially on the at least one non-transitory computer-readable medium of the at least one remote processing server, wherein each of the fields of the user-managed BOM has a user-selected property associated therewith, and wherein the properties associated with each field in part determine a location on the at least one remote database for storing information associated with each field, and further wherein the information associated with each field of the user-managed BOM is configured to be edited by multiple user profiles simultaneously.

In an aspect, the proposed BOM further can include various highlighted fields which are indicative of a particular user profile that is either viewing or editing a particular highlighted field, wherein each user profile has a different highlighting color associated therewith.

In another aspect, the first user profile can be configured to grant read/write permissions to an additional user profile for selected fields. In another aspect, the read/write permissions can include additive permissions that allow the additional user profile to generate additional fields in the user-managed BOM. In another aspect, the additional user profile permissions include controlling read/write permissions associated with any additional fields generated by the additional user profile. In an aspect, a user profile having read/write permissions saves an immutable revision of the user-managed bill of materials, whereas user profile having read permissions views a history of changes between revisions.

In an aspect, one or more properties or information associated with the fields of the user-managed BOM of a given revision are unalterable. In another aspect, one of the fields contains information associated with a second user-managed BOM, wherein the immutable revision preserves the information associated with the second user-managed BOM at a moment of saving. In another aspect, one of the fields can include information associated with a second user-managed BOM, wherein the immutable revision preserves the information associated with the second user-managed BOM at a moment of saving. In yet another aspect, one of the fields can include information associated with a revision controlled item, wherein the immutable revision preserves the information associated with the revision controlled item at a moment of saving. In yet another aspect, one of the fields can include information associated with a revision controlled item, wherein the immutable revision allows the information associated with the revision controlled item to be saved according to a user-profile-selected revision of the revision controlled item.

FIG. 1 illustrates an exemplary network architecture for creation and management of BOM in which aspects of the present disclosure can be implemented. As can be seen, architecture of the proposed system can be implemented across one or more networks which are spaced across geographies and enable remote/local users from one or more organizations/departments to access BOM 104 that can be hosted on a server or cloud. As shown, networks 106-1 and 106-2 can be configured to which one or more remote users such as 102-1 (from Engineering Department) and 102-2 (from Purchase Department) can respectively be operatively coupled and allowed to access the BOM 104. Similarly, local users 102-3 (from R&D department) and 102-4 (from finance department) can also be configured to locally access the BOM 104.

As would be appreciated, each user (local or remote) 102 can be assigned certain rights to access the BOM 104, wherein such rights can either be only to view the BOM 104 or to edit the BOM 104. Rights can also be assigned either to the complete BOM 104 or to specific/defined sections/fields thereof, wherein each field of the proposed BOM 104 (also referred to as BOM sheet) is structured with defined properties. For instance, "type" field of the BOM 104 can be configured to accept specific values and allow only certain types of operations/actions to users 104 editing the BOM 104.

In yet another aspect, the proposed system can be designed to prepare BOMs for any field of business, and can be configured with structured fields that have predefined properties so as to prepare BOMs more efficiently and quickly. Also, the proposed system, which can be configured in the form of a downloadable application, for instance, enables user to save revisions of the BOM in the form of historical immutable snapshots. The proposed system further supports third party software such as CAD, wherein users can be restricted to edit/view certain parts of the BOM depending on their role/attributes. Also, the proposed system enables multi-level BOMs to be created because of the structured nature of fields.

In another aspect, the proposed disclosure/system can be configured such that multiple users, each having differentiated roles need not view all fields of a BOM. For example, fields relevant to a manufacturer may not be necessary for an engineer for the same BOM. It may also be configured that certain fields/section of the BOM are viewable to a user but locked for editing based on rights associated with the user.

In an aspect, changes made by a user A to the proposed BOM can be intimated to all users whose rights allow them to be notified when fields/sections that the user A edited are updated. It may also be possible that editing done by user A on a BOM is only effected/updated when user B, when intimated about the proposed editing, confirms the edits. Furthermore, in another implementation, an administrator may be intimated whenever a user, who does not have an access to a field/section, attempts to edit the field/section, even though such action would be unsuccessful and the user would not be allowed to edit. In yet another exemplary embodiment, the proposed system allows for change reporting, wherein at any moment of time, a user can create a report (for instance in .xls or any other spreadsheet format) regarding what changes occurred between two specific BOM revisions. Such revision editing can be performed dynamically and/or at manually selected events, and therefore the proposed system enables creation of revisions (immutable snapshots) by a user, in addition to keeping track of edits automatically. Users can also create a revision at any time; they are an immutable snapshot of a BOM at a specific moment of time.

As discussed above, the proposed system can have pre-defined field structure, meaning that each field in the proposed system can have one or more predefined properties, based on its type. Such structured fields enable better management of BOMs and add features such as multi-level BOMs. The pre-defined property types can include properties such as: Number, Text, List, Reference, Draftsman, Owner, Cost, Purchase Order, Client, Vendor, Project, Sales Lead, Engineer, Designer, Revision, Status, Material, File Type, CAD, Quantity, Thumbnail Image, or any number of properties which enables efficient management/scaling of BOMs and is focused on a specific field of BOMs. These pre-defined properties enable the system to create pointers and direct where in the database(s) to store the information associated with each of the pre-defined fields. It also assists in retrieving information quickly. Any entered or uploaded information can also be scrubbed on the user interface end to reduce the load or amount of information and coupled with a Web Service API to quickly move information between users.

Properties for different fields can also be defined based on the entity/user that would/should be allowed to edit that field, possible values that the field can take, kind of edits that the field can undergo, impact that each field edit should/would have on other fields, among other like property definitions. For instance, one property for field "part quantity" can be that when the quantity is less than a defined threshold, vendor of the part be automatically notified, wherein such a property can be defined in a template such that each BOM administrator can configure/customize the template accordingly. For instance, the template can be "when part quantity of <<part>> is less than <<n>>, email <<vendor>> at <<vendor email address>>", which gives the flexibility to the administrator to define the values of part, n, vendor, and vendor email address for multiple parts that form part of a BOM, and for multiple BOMs that either work independently or work in a multi-BOM architecture. As would be appreciated, one or more the fields (including properties thereof) and values thereof can be stored in a database that can be local or remote to the BOM.

The predefined properties in one sense act as filters and/or links and enable the fields to analyze the information entered therein. For example, "D-85" entered into a field without a field property is nothing more than text in a field. However, if the property of the field is defined as "Part Number" the field can now use "D-85" to locate information associated with that field from a database where part numbers are stored. Additionally, an adjacent field may have "V" entered therein. Again, without a defined property associated with the field, "V" has no value other than entered text. If the field is now defined as a "Revision" field, it can associate revision with either a project, part number, or other field to create a more intelligent system. Continuing with this example, if a part number, "D-85" has been placed in the field next to revision field "V" the revision field can look to the part number and confirm in a database that "D-85" has a revision V associated therewith. If not, it can add a new revision number to the part number, confirm the revision level is correct, ask if this is revision corresponds with the adjacent part number or if blank populate a revision number based on the part number entry adjacent the "Revision" field.

Information associated with the fields can be user entered, drawn out of a remote database, or uploaded by a user. For example, the engineering team design creates a new Skateboard assembly 300B (refer to FIG. 3B) having various components: front axle 302, with left and right front wheels 310a-b, rear axle 304, with left and right rear wheels 312a-b, board 306, and brakes 308. If this is a new skateboard assembly, the engineering team can upload the CAD files associated with each part as well as the overall assembled 300B system into the remote database. As revisions to the board, axles or wheels are made those models can be further uploaded and associated with the original versions. Alternatively, components such as the axles and wheels might be standard parts that have been incorporated into the new skateboard assembly 300B. These parts might already be in the database and by entering their part number can now be associated with or linked to the Skateboard assembly 300B BOM.

It should be noted that when files are uploaded or information is entered, the system in one embodiment extracts the relevant information and data from the file or entered parameters. The system can utilize a Web Service API to extract the relevant information, which in part helps enable faster transfers of information.

Figure 3A:
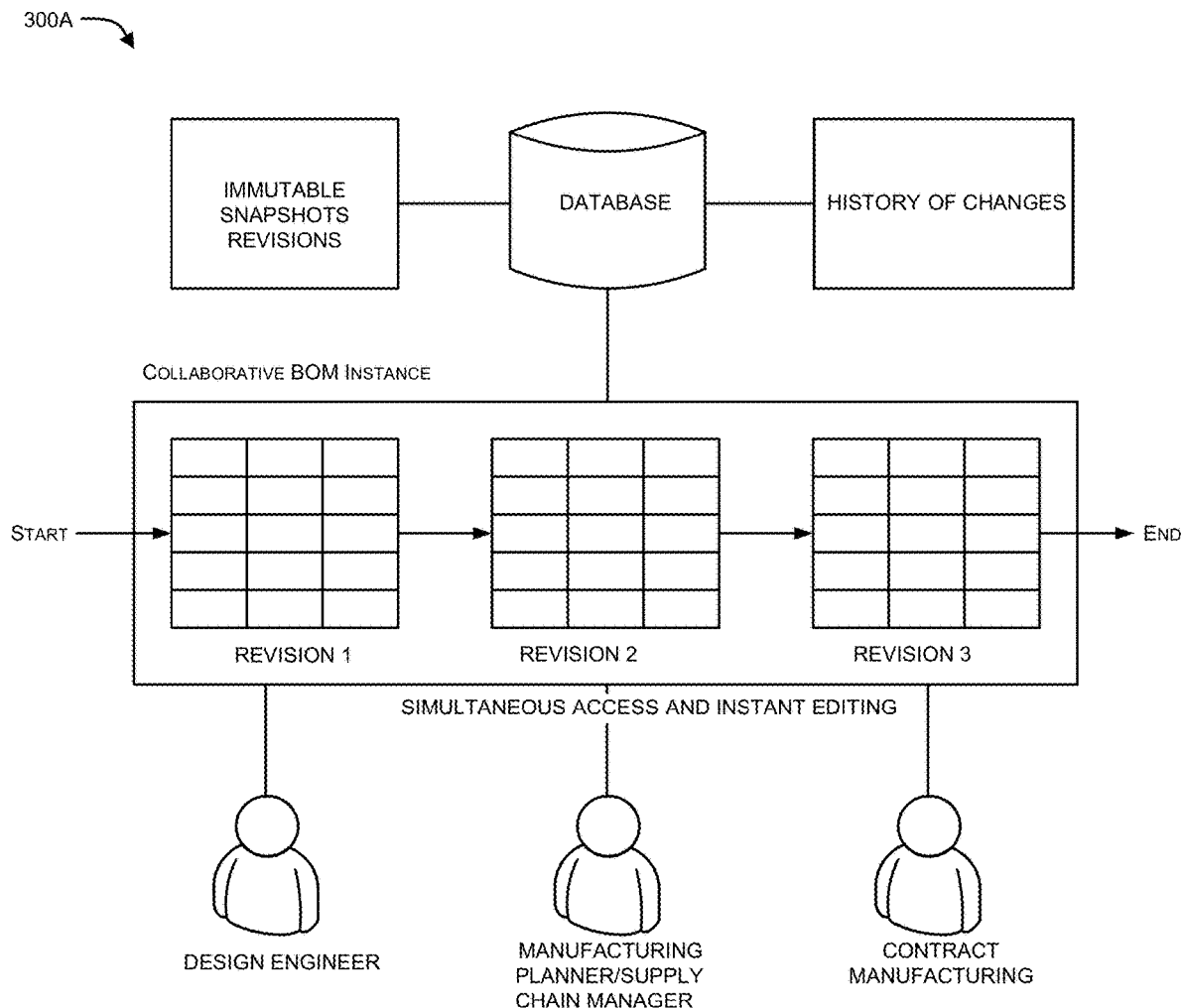
FIGS. 3A to 3D illustrate exemplary BOM management and version/revision control in accordance with an embodiment of the present disclosure.
Figure 3B:
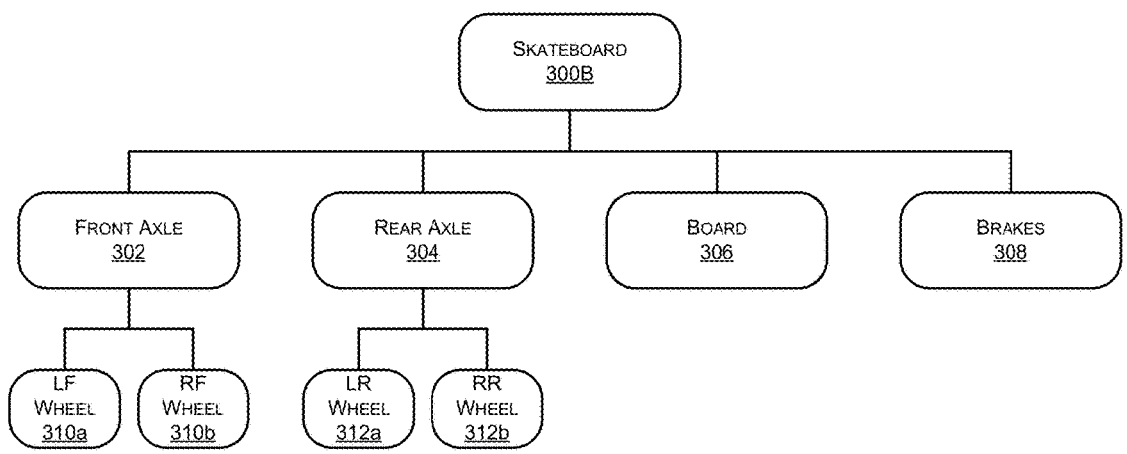
Figure 3C:
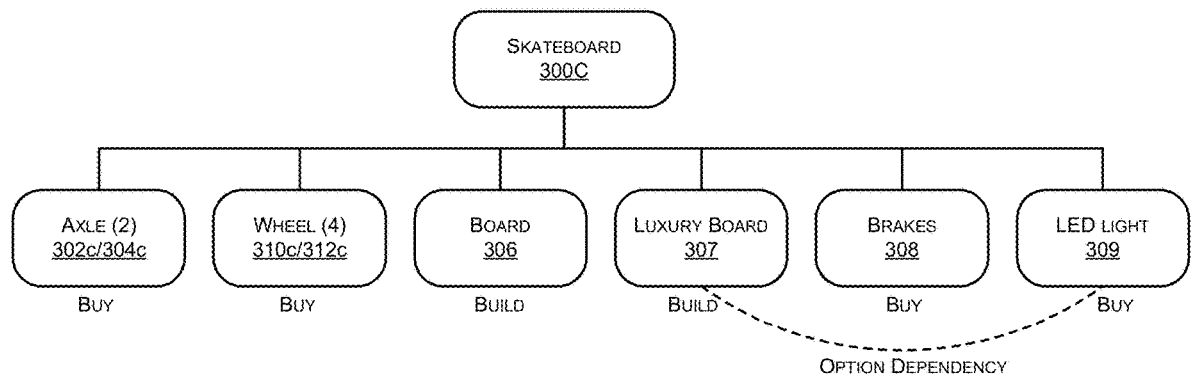

The design team can be working in real-time with the engineering team, as well as the purchasing team to update skateboard assembly 300B to 300C (refer to FIG. 3C). The design team might recognize that the front and rear axles are interchangeable as well as the wheels, or that an equivalent axle 302c/304c can be purchased from a vendor. Similarly, they might recognize that certain wheels are more popular and swap out 310a-b and 312a-b for popular or easily obtainable wheels 310c/312c. The purchasing agent can also in real-time look to source certain components and place quantities based on estimates from a sales team. The design team might also add a luxury board 307 with an LED light 309 as "optional package" or premium offering skateboard assembly 300C. The engineering team can now pull this luxury board into their models as an option or modify it to fit the current system. Those modifications can then be source to manufacturing, who has purchasing send LED lights 309 to them for integrating into the luxury board. As a result of the structural system, and in particular the properties associated with each field, the remote database can appropriately store each of these updates. Once a "released BOM" is created an immutable snapshot of everything in the given revision is permanently saved. Thus, skateboard assembly 300B can be saved as one immutable snapshot and skateboard assembly 300C can be saved as another. If the individual parts, quantities, vendors and so forth are updated a new immutable snapshot or BOM revision can be saved such as 300D (refer to FIG. 3D) which includes front and rear components 330 and 340 along with a paint scheme 320. These immutable snapshots are determined by the user. A history of changes between each snapshot can be determined as well. The history of changes can even track multiple changes to a given field. For example, if the wheel diameter was specified at 4 inches by one user, then another user specified 6 inches or changed the field to 6 inches, and then a third user updates it to 5 inches, the database saves each of those entries. However, if it gets changed back to 6 inches and an immutable snapshot is taken or saved, that revision will forever have the wheel diameter as 6 inches. By saving immutable snapshots, updates can be made to each of the parts, quantities, vendors and so forth in real-time without changing or effecting a prior BOM revision. This is managed through the database, which stores the information based on the properties associated with each field.

As mentioned above, the proposed system allows Multi-level bill of materials wherein, for instance, each level can be for one part of a vehicle (say tire, steering, brakes) where each part can include multiple components, details of which would come in respective part level. As also mentioned above, the proposed system enables integration with CAD with an ability of BOM being imported from/into all major CAD systems such as SolidWorks, SolidEdge, Altium Autodesk Inventor, and Autodesk Fusion360.

In an aspect, the system 100 of the present disclosure can be implemented as a web application, or a mobile application, or in any other form factor that allows aspects of the present invention to be protected. BOM can be represented as a graph data structure that contains elements of data in the product—assemblies, sub-assemblies, components and information about them. Depending on the type of product and manufacturing process, BOM can include a variety of constraints. A simple example of constraints is a specific configuration of a product (options), plant constraints (product manufactured in different plants), date constraints (availability of a specific component for a period of time) and cost constraints (MOQ—minimum order quantity, which depends on number of units you want to build). Information about these constraints as well as a BOM structure (graph)

can typically be stored in a database (or multiple databases) depending on a company and software used to manage BOM. FIG. 2A illustrates an exemplary representation of BOM interface 200A of how a collaborative BOM management system 100 can be structured for design purposes. FIG. 2B illustrates an exemplary representation of an invitation or administrative interface 200B of how a collaborative BOM management system 100 can be structured for adding users and assigning permissions for a given BOM. FIG. 2C illustrates an exemplary representation of a Change of History interface 200C of how a collaborative BOM management system 100 can be structured for displaying the various changes to a particular BOM were made and between saved revisions or immutable snapshots. In some instances, the values can also be assembly operation sequences.

In an exemplary aspect, the proposed technique/system relies on the demand of users—engineers, manufacturing planners, supply chain managers and others to access and edit BOM in a way of table (or spreadsheet) that represents information that can be accessed and edited. In addition, the proposed method allows multiple users to access and change data simultaneously at the time while maintaining consistency of data and operations between changes made by multiple users. In an aspect, the proposed system processes data about BOM and arranges it in a way of a table with properties representing various characteristics of information and lines representing items (assemblies, subassemblies and parts). In a further aspect, the proposed technique/system/method allows multiple users to edit bill of materials (BOM) simultaneously and maintain consistency of data and operations.

In an aspect, the proposed system allows for multiple users to simultaneously work in a particular BOM. Using the example above, as part of the engineering team is vetting the viability of a potential new replacement component that a sourcing agent is acquiring information on, another part of the engineering team could be developing a new revision. Each user or group can update the particular BOM as information becomes available. Other BOMs that incorporate such a component can also be updated and the changes be proliferated through the proposed system, which ability to simultaneously work and edit a particular BOM can be enabled by capturing the change history of each user, maintaining or keeping relationships of components through the editing process, and taking 'immutable snapshots' along the way.

By capturing the change history of each user, a clear picture of the processes used to bring about the designated changes can be recorded and analyzed (see FIG. 3A as an example), which allows for retracing of steps and altering processes with other users to ensure that correct solutions are reached. 300A is another exemplary embodiment of structural overview of a collaborative BOM system where multiple users interact with a particular BOM through the various revision cycles. Users can access the system through a portal such as a web browser where each user can be given a unique identifier that is traceable as they interact with the system.

Figure 3D:
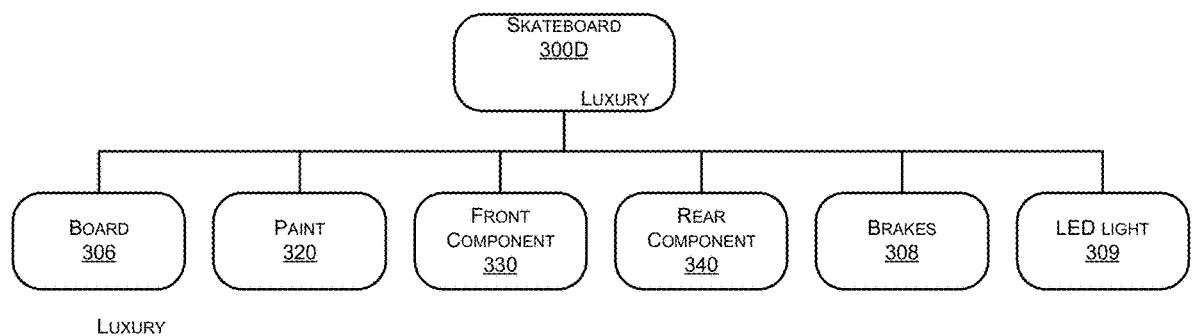

When accessing the system, the user can be presented with a spreadsheet like interface as shown in FIG. 3B that provides information such as manufacturing, engineering, and sales data sources. When a user goes to edit a given box or set of data presented in the spreadsheet, the proposed system tracks the relationships of the data to maintain the data integrity. For example, a particular part might have the following information associated with it: SKU, Sourcing Agent, Supplier(s), system(s) the part is used in, engineering team assigned to the system, name, revision level and so forth. If a particular supplier is going out of business and will no longer be providing that particular component, multiple users can interact with the BOM to ensure a new component, supplier, revision, and integration occur all while simultaneously working on the given task. Each user can be given certain permissions as to whether they can edit or view only the updates as they occur (see FIG. 3C). FIG. 3D shows revised relationship between fields based on dependency relationship between various stakeholders/parts/components. As the part is modified, those links of data dependencies, references and/or connections can be forwarded or transferred to the edited component. In this manner, the proposed system becomes more akin to 3D system where although the particular part or name has changed, the underlying dependencies, relationships, references, and connections have been maintained.

Another way of preserving these underlying relationships includes taking an 'immutable snapshot' at any given point during the history of changes process. Looking again at FIG. 3A, one can see various "Revisions" which are associated with the History of changes log. Each of these revisions can be queued as an immutable snapshot of all the given relationships, properties, references, sources, connections and so forth associated with each part in the given BOM and throughout other BOMs in the system. While the history of changes occurs, it allows those dependencies and relationships to be updated, but once an immutable snapshot is taken, those relationships are preserved in memory by the proposed system. These immutable snapshots can then later be referred to as needed to restore a previous set of relationships, or for any number of other reasons that would require those dependencies to remain in place.

It should be noted that when multiple users are accessing the same BOM, visual indicators can appear on the screen and the viewing of real-time updates is possible. Certain rules can be implemented, such as who can edit mentioned above, or others that include sequencing, any hierarchical controls, and notifications of changes.

For purposes of this application, a web browser may refer to a software application or display produced by steps performed by processing circuitry for retrieving, presenting, interpreting, and traversing information resources provided by a remote server (e.g., on the internet). At the time of this application, web browsers may include Chrome, Firefox, Internet Explorer, Opera, and Safari. In addition, a web application, also referred to as an application or "app" as described herein, includes computer software designed to help the user to perform specific tasks on a computer or using a mobile device. The application functions can be performed by processing circuitry such as a computer, a mobile device, or a server, as further described herein. For purposes of the systems and methods described herein, a plug-in may refer to a set of software components that adds specific abilities to a larger software application, such as a web browser. Plug-ins enable customizing the functionality of an application and may be implemented in any suitable architecture, such as a Flash player, Java applet, HTML5, or any other commonly used platform known in the art. For purposes of method, a plug-in is a general term that could also be synonymously associated with add-ons, snap-ins, and extensions. In certain contexts, the term "application" may also be used to describe a notification and/or response for an employment opportunity.

In one embodiment, when activated, the processing circuitry can record any changes in a BOM into a database and display a History of Changes in a browser panel powered by the plugin. The processing circuitry can also cause visual indicators on the display indicative of other users simultaneously viewing or editing the particular BOM being viewed by the current user. The processing circuitry can retrieve information from one or more databases upon an inputted request from a user.

In an aspect, the proposed system described herein can be provided with one or more processing circuitry components, such as processors that access one or more databases stored locally or in networked (or cloud) based system. The processing circuitry can cause accessed information in the database to be outputted to a display or outputting device. Input devices, such as keyboards, monitors, touchscreens, mics, mice, and so forth can be used to cause the processing circuitry to perform a given task. As discussed above, the system can be configured to automatically store History of Changes, transfer data relationships through a multi-user editing process. Immutable snapshots of particular moments in the editing process can be recorded and later retrieved.

In an aspect, multiple users can interact with a single BOM, wherein, in an instance, three different users (design engineer, supply manager, contract manufacturing) can interact with the BOM through a revision process, wherein each user contributes to updating the BOM and those revisions are gathered and updated to a final output or stage, at which point an immutable snapshot could be taken. The history of changes for each user can be recorded and stored in a database. Information from the BOM can be pulled from a database including any previous immutable snapshots which the users may use.

It is important to understand for purposes of this application that simultaneous users can mean having multiple users having editing or viewing access to a particular BOM at the same time. It can mean simultaneously editing a document; however, it is also intended to mean that a collaborative environment where multiple users can see the modifications occurring in real time and contribute (or not) accordingly. Often the changes that occur will occur sequentially. For example, as the design engineer is uploading a new schematic or part, the supply chain manager can see that and modify a quantity or supplier information shortly thereafter having viewed the changes. In this way, control of the BOM does not need to change hands or editing be facilitated from a single source.

Figure 4:
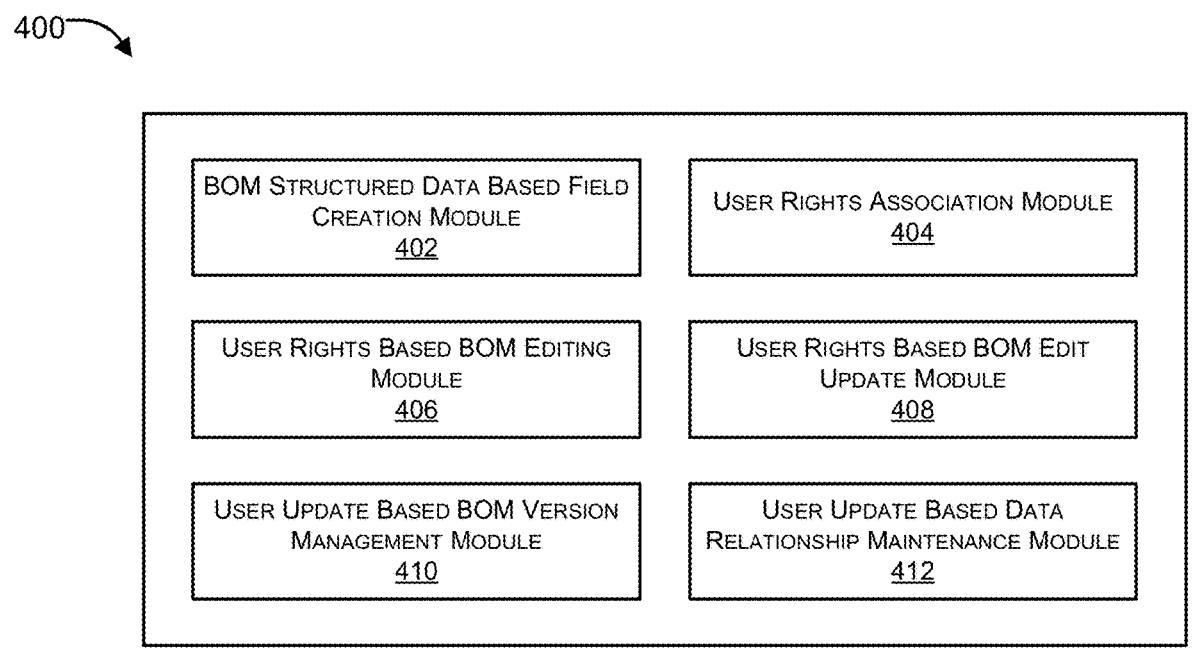
FIG. 4 illustrates exemplary functional modules for creation and management of BOM in accordance with an embodiment of the present disclosure.

FIG. 4 illustrates exemplary modules overview 400 of various functional modules for the creation and management of BOM in accordance with an embodiment of the present disclosure. In an aspect, the present disclosure relates to a collaborative Bill of Materials (BOM) management system (100, 300A), said system comprising a non-transitory storage device having embodied therein one or more routines operable to create and manage the collaborative BOM that is editable by one or more users; and one or more processors coupled to the non-transitory storage device and operable to execute the one or more routines, wherein the one or more routines include a user rights based BOM editing module 406, which when executed by the one or more processors, enables a first user to, based on rights assigned to the first user, edit the BOM, wherein the BOM comprises a plurality of structured fields, each of the plurality of structured fields having at least one defined property. In an aspect, such editing should be interpreted to include any action that a user takes on the BOM including, for instance, accessing and viewing one or more sections/fields of the BOM based on the rights which are assigned by the respective user. All such actions can be logged for the user and can be viewed anytime going forward by an administrator (or any other authorized user) on a user-level basis. Administrator can also, for instance, specify specific fields (such as part number), and for a date range review all actions that have been taken by multiple users on the specified fields during the date range.

The system of the present further includes a user rights based BOM edit update module 408, which when executed by the one or more processors, updates/informs/intimates at least a second user of the editing done by the first user based on rights assigned to the second user, wherein the rights of the second user are at least for the sections or fields edited by the first user. For instance, if user A and B have editing/viewing rights over the field "part quantity", and user A makes an edit on the field, the system of the present disclosure can then intimate user B of such a change. Any user-level configuration of when and how such updates need to be given to different users having rights over specific fields/sections of the BOM is completely within the scope of the present disclosure.

In an aspect, a user update based BOM version management module 410, which when executed by the one or more processors, makes a version of the BOM based on the editing done by the first user. Such versioning can be made on each update/edit or at predefined/pre-configured timepoints/actions.

In an aspect, the rights can be assigned to enable the user to either edit or only view the BOM. In another aspect, the rights can be assigned for editing or viewing of one or more sections of the BOM, or for editing or viewing of at least one field of the BOM.

In another aspect, system of the present disclosure can further include a user update based data relationship maintenance module 412, which when executed by the one or more processors, automatically, based the editing done by the first user, assesses impact of the editing and maintains data relationship across one or more sections and/or fields of the BOM based on the assessed impact. For instance, if part quantity impacts when the purchase request is to be issued for new parts, such dependency relationships are updated/assessed after each edit.

In an aspect, being collaborative, the present system allows a third user to edit the BOM simultaneous to the first user. In another aspect, the proposed system can further include a BOM structured data based field creation module 402, which when executed by the one or more processors, enables at least one administrator to create the plurality of structured fields having corresponding properties for each field. Each field of the proposed BOM therefore has at least one property that defines the kind/type of data it stores, values it can accept, impact it creates on other fields, and relationships it has with other BOM sections.

The system of the present disclosure can also include a user rights association module 404, which when executed by the one or more processors, enables an administrator to assign rights to one or more users for editing or viewing of one or more sections of the BOM, or for editing or viewing of at least one field of the BOM.

In yet another aspect, the system can include a user activity history management module 416, which when executed by the one or more processors, manages user-level history of actions performed on the BOM by each user of the BOM.

Figure 5E:
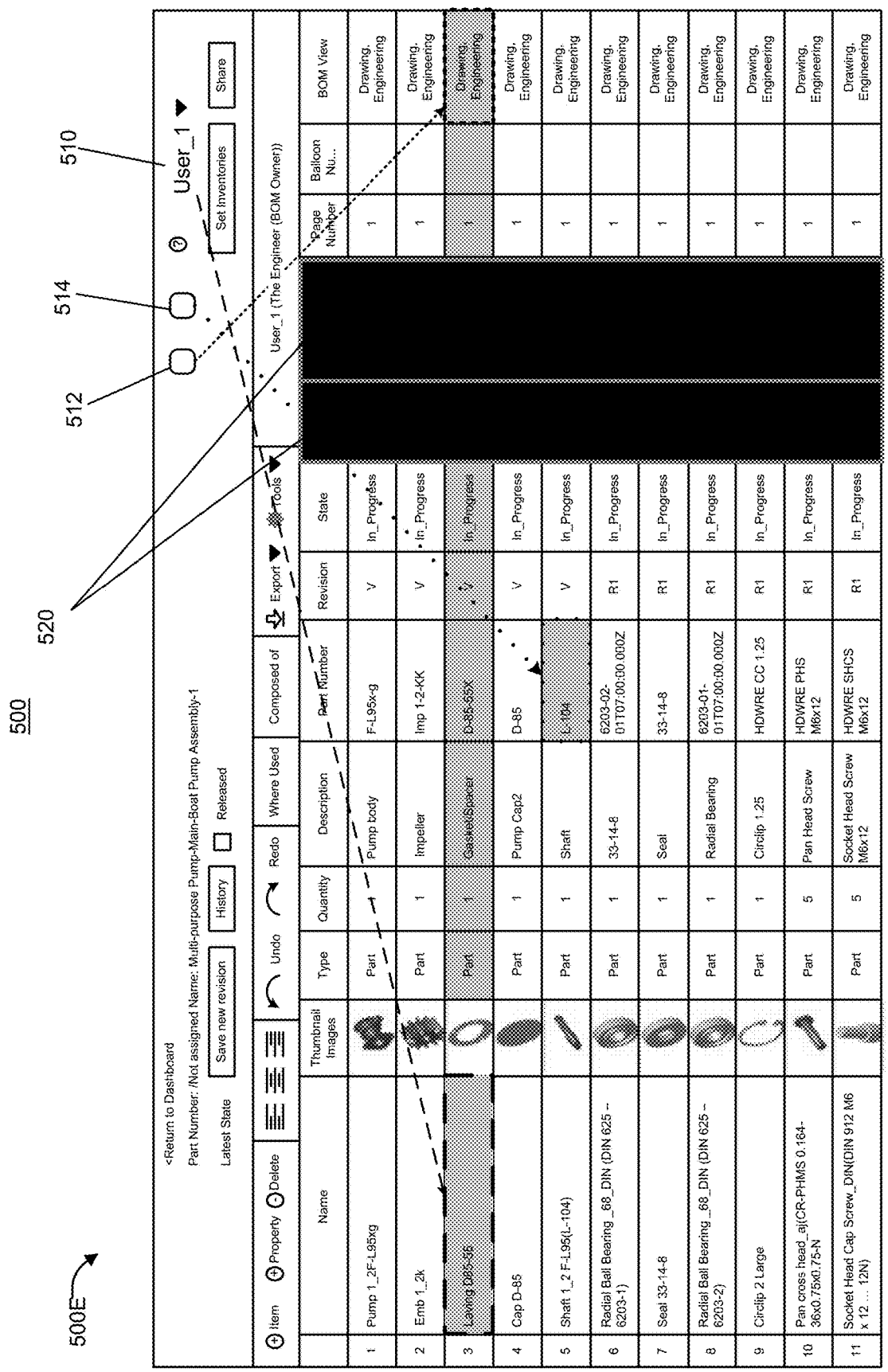
FIGS. 5A to 5E illustrate exemplary representations show how BOM can be created, edited, updated, and managed in accordance with an embodiment of the present disclosure.

FIGS. 5A to 5E illustrate exemplary representations showing how a collaborative BOM management system 500 can be created, edited, updated, and managed in accordance with an embodiment of the present disclosure. FIG. 5A illustrates an exemplary representation of BOM interface 500A (or BOM sheet) showing multiple fields (such as name, image, type, quantity, description, etc.) and corresponding entries for each field for one or more parts/components that form part of the BOM. 500A shows a single user 510 accessing the BOM. FIG. 5B illustrates how user 510 can invite additional users 512 and 514 and granted each specific permission for read and/or write access. In this particular embodiment, a pop-out window 508 in BOM interface 500B allows user 510 to add users via e-mail and determine various permissions. These users can collaboratively update/edit in real-time whether they are remote or local. Such users can be across multiple organizations/entities or across departments of an organization. FIG. 5C shows how a BOM interface 500C is viewed and shared across multiple users across departments/entities, allowing them edit/view the BOM based on rights assigned to them. Each user, when logged in, is identified by a highlighted or other designated indicator around a field showing the other users what field they are specifically viewing or editing.

Figure 5F:
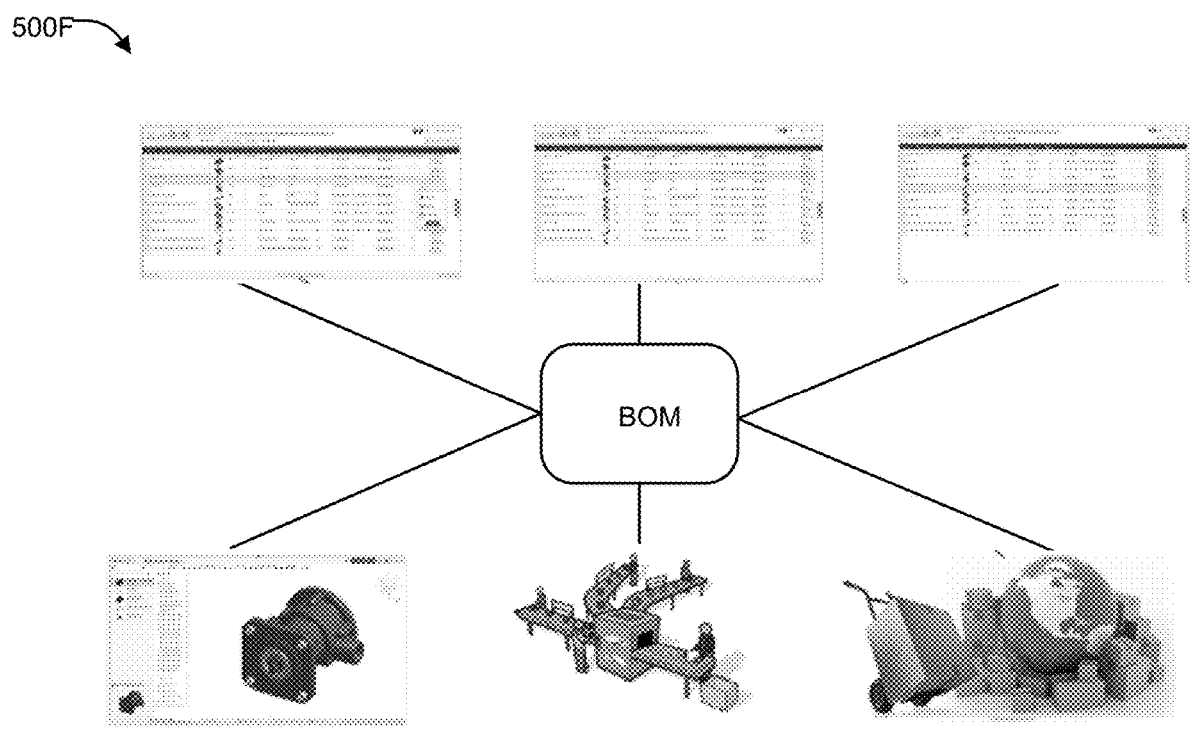

In a further aspect of permissions, although a user may be given an editing right, such right can be further be assigned/configured such that it only allows the user to edit in a specific range or only for a specific part. FIG. 5D shows how a single row 522 of exemplary BOM interface 500D relating to a given part/component can be edited/updated by two or more users from same or different departments/entities, allowing them edit/view the BOM based on rights assigned to them. In an aspect, although a user may be given an editing right, such right can be further be assigned/configured such that it only allows the user to edit in a specific range or only for a specific part (row). For instance, user 512 may only be allowed to edit the quantity from 5-40 and not outside this range. Editing rights therefore may also be further limited based on administrator configuration. Editing rights therefore may also be further limited based on administrator configuration. Sharing of BOM can only be done by a user that has the necessary rights to do so. FIG. 5E shows how some users can be granted a selected viewing of BOM interface 500E. As illustrated certain columns 520 are completely blocked out; however, it should be understood that another way of implementing this is to merely not have those columns or fields show up (whether blocked out or not) on that particular user's screen altogether. FIG. 5F illustrates an exemplary instance 500F showing how different users having defined roles can be a part of the proposed system and be assigned specific viewing/editing rights. All changes to the BOM of the present invention can be versioned automatically and history be maintained at a user level to enable complete access/assessment of how the BOM has evolved over a defined period of time, how different users have taken actions, kind of actions taken, impact of such actions on entities/departments/users, and how data relationships between entries/fields/components/parts have refined.

Figure 6:
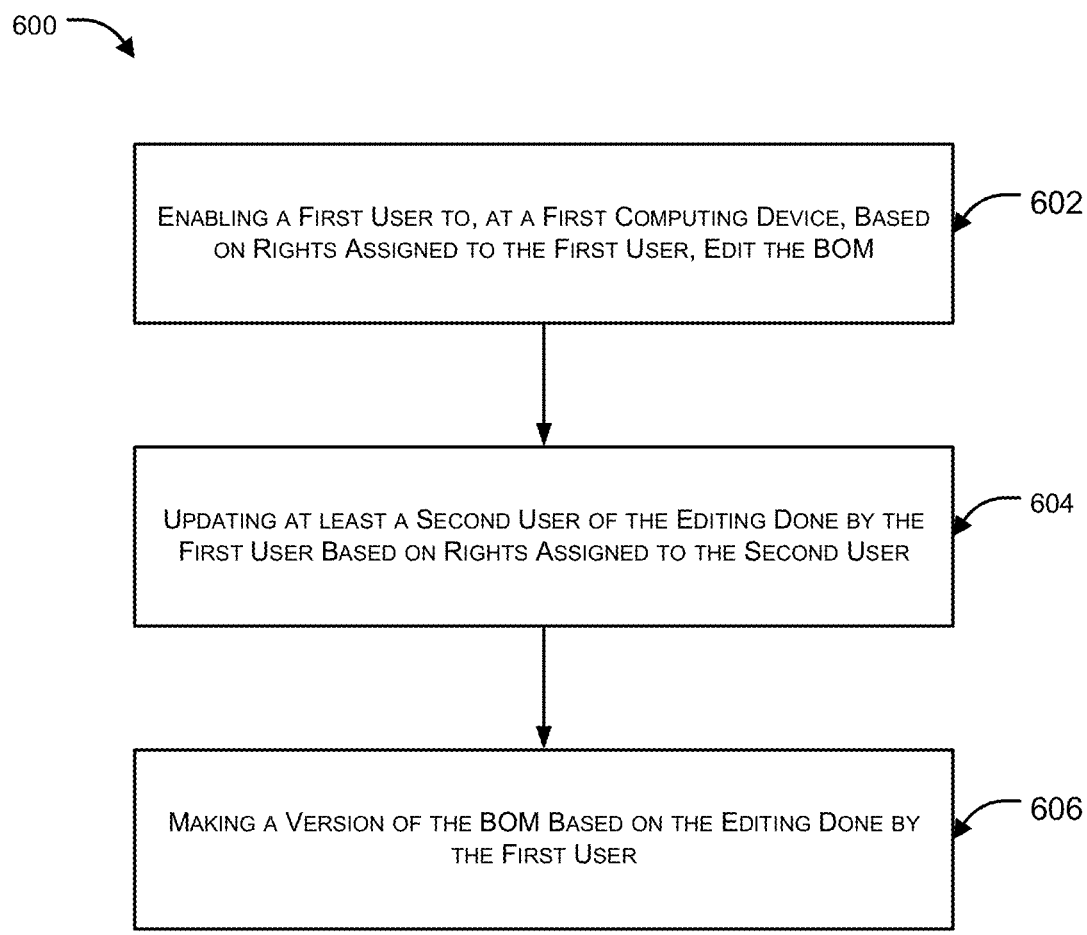
FIG. 6 illustrates an exemplary flow diagram showing creation and management of BOM in accordance with an embodiment of the present disclosure.

FIG. 6 illustrates an exemplary flow diagram showing creation and management of BOM in accordance with an embodiment of the present disclosure. As shown, method 600 of the present disclosure comprises the steps of, at step 602, enabling a first user to, at a first computing device, based on rights assigned to the first user, edit the BOM, wherein the BOM comprises a plurality of structured fields, each of the plurality of structured fields having at least one defined property; at step 604, updating at least a second user of the editing done by the first user based on rights assigned to the second user, wherein the rights of the second user are at least for the sections or fields edited by the first user; and at step 606, making a version of the BOM based on the editing done by the first user.

In an aspect of the invention, the rights can be assigned to enable the user to either edit or only view the BOM. Rights can further be assigned for editing or viewing of one or more specific sections of the BOM, or for editing or viewing of at least one field of the BOM.

In another aspect, the proposed method can further include the step of automatically, based the editing done by the first user, assessing impact of the editing and maintaining data relationship across one or more sections and/or fields of the BOM based on the assessed impact.

In another aspect, the proposed method can further include an initial step of enabling at least one administrator to create the plurality of structured fields having corresponding properties for each field. Post such creation of structured fields, the method can enable an administrator to assign rights to one or more users for editing or viewing of one or more sections of the BOM, or for editing or viewing of at least one field of the BOM.

In an aspect, the proposed method can include the step of managing user-level history of actions performed on the BOM by each user of the BOM.

In an aspect, the plurality of structured fields can be selected from any or a combination of part name, part usage, part quantity, part price, part image, part type, part description, part number, part unique identifier, revision, state, material, product that the part forms part of, manufacturer information, supplier parameters, and part attributes.

Figure 7:
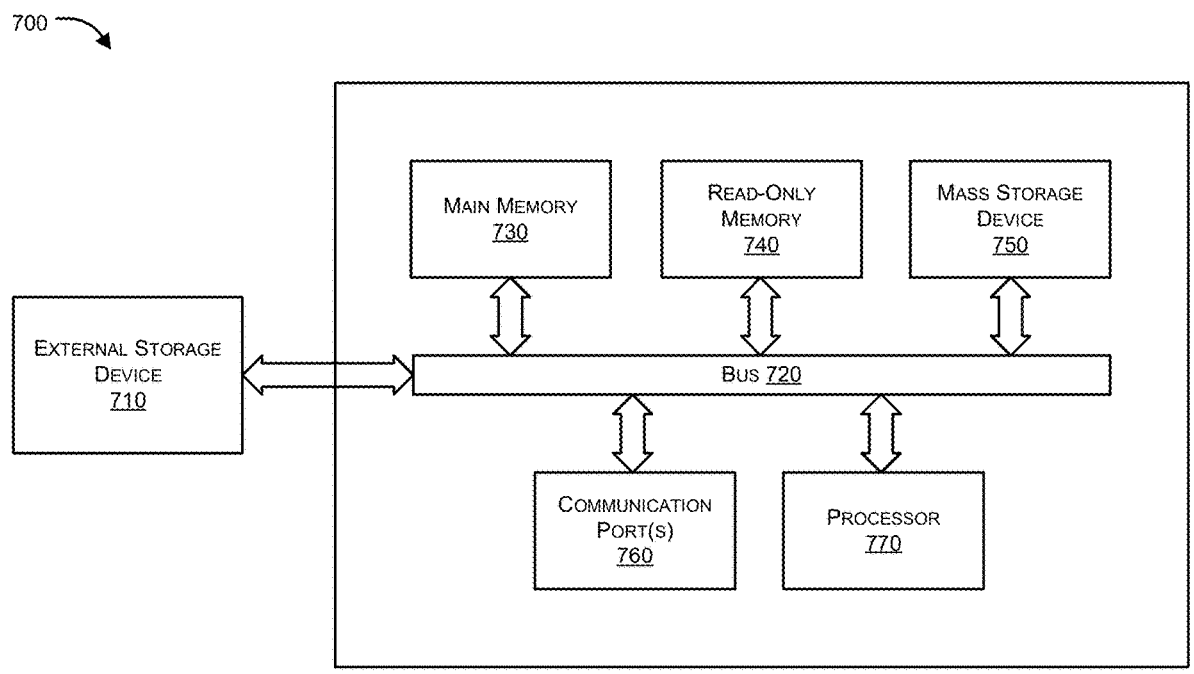
FIG. 7 illustrates an exemplary computer system in which or using which aspects of the present disclosure can be implemented.

FIG. 7 illustrates an exemplary computer system in which or using which aspects of the present disclosure can be implemented. Computer system 700 includes a bus 720 or other communication mechanism for communicating information, and a processor 770 coupled with bus 720 for processing information. Computer system 700 can also include a main memory 730 or other non-transitory computer-readable medium, such as a random-access memory (RAM) or other dynamic storage device, which can then be coupled to bus 720 for storing information and instructions to be executed by processor 770. Main memory 730 also may be used for storing temporary variables or other intermediate information during execution of instructions to be executed by processor 770. Computer system 700 may further include a read only memory (ROM) 740 or other static storage device coupled to bus 720 for storing static information and instructions for processor 770. A data/external storage device 710, such as a magnetic disk or optical disk, is provided and coupled to bus 720 for storing information and instructions.

Computer system 700 may be coupled via bus 720 to a display (not shown), such as a cathode ray tube (CRT), for displaying information to a user. An input device (not shown), including alphanumeric and other keys, can be coupled to bus 720 for communicating information and command selections to processor 770. Another type of user input device can be cursor control, such as a mouse, a trackball, or cursor direction keys for communicating direction information and command selections to processor 770 and for controlling cursor movement on display. This input device typically has two degrees of freedom in two axes, a first axis (e.g., x) and a second axis (e.g., y), that allows the device to specify positions in a plane.

The invention is related to the use of computer system 700 for creation and management of BOMs as elaborated above. According to some embodiments of the invention, such use may be provided by computer system 700 in response to processor 770 executing one or more sequences of one or more instructions contained in the main memory 730. Such instructions may be read into main memory 730 from another computer-readable medium, such as storage device 750. Execution of the sequences of instructions contained in main memory 730 causes processor 770 to perform the process steps described herein. One or more processors in a multi-processing arrangement may also be employed to execute the sequences of instructions contained in main memory 730. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 770 for execution. Such a medium may take many forms, including but not limited to, non-volatile media, volatile media, and transmission media. Non-volatile media, which includes, for example, optical or magnetic disks, such as storage device 750. Volatile media includes dynamic memory, such as main memory 730. Transmission media includes coaxial cables, copper wire and fiber optics, including the wires that comprise bus 720. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 770 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 720 can receive the data carried in the infrared signal and place the data on bus 720. Bus 720 carries the data to main memory 730, from which processor 770 retrieves and executes the instructions. The instructions received by main memory 730 may optionally be stored on storage device 750 either before or after execution by processor 770.

Computer system 700 also includes a communication interface 760 coupled to bus 720. Communication interface 760 can provide a two-way data communication coupling to a network link (not shown) that can be connected to a local network (not shown). For example, communication interface 760, may be an integrated services digital network (ISDN) card or a modem to provide a data communication connection to a corresponding type of telephone line. As another example, communication interface 760 may be a local area network (LAN) card to provide a data communication connection to a compatible LAN. Wireless links may also be implemented. In any such implementation, communication interface 760 sends and receives electrical, electromagnetic or optical signals that carry data streams representing various types of information.

As used herein, and unless the context dictates otherwise, the term "coupled to" is intended to include both direct coupling; in which two elements which are coupled to each other contact each other, and indirect coupling; in which at least one additional element is located between the two elements. Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps which are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the spirit and scope of the disclosure, as described in the claims.

I claim:

1. A system for collaborative Bill of Materials (BOM) management, said system comprising:
 a non-transitory storage device having embodied therein one or more routines operable to create and manage a collaborative BOM that is editable by one or more companies, each company having one or more users; and
 one or more processors coupled to the non-transitory storage device and operable to execute the one or more routines, wherein the one or more routines include:
 a user-managed BOM having a plurality of structured fields, wherein each of the plurality of structured fields has at least one user-selected property associated therewith;
 a user rights based BOM editing module, which when executed by the one or more processors, enables a first user associated with a first company to, based on rights assigned to the first user associated with the first company, edit a portion of the collaborative BOM;

a multi-level relationships module, wherein the collaborative BOM is comprised of multiple levels and the multi-level relationships module is configured to identify and maintain relationships between each of the various levels;

a component relationship management module, configured to manage a relationship of each component to its usage and manage a relationship of each component with respect to products, assemblies, and sub-assemblies, which can be displayed in a graph, wherein the at least one user-selected property of each of the plurality of structured fields facilitates the operation of the multi-level relationships module and the component relationship module;

a user rights based BOM edit update module, which when executed by the one or more processors, updates additional users associated with the one or more companies of the editing done by the first user associated with the first company based on rights assigned to each of the additional users associated with the one or more companies, wherein the rights of each of the additional users associated with the one or more companies are at least for a portion of the sections or fields edited by the first user; and a user update based BOM revisions management module, which when executed by the one or more processors, makes a version of the collaborative BOM based on the editing done by the first user.

2. The system for collaborative Bill of Materials (BOM) management of claim 1, wherein the rights assigned to each additional user are to either edit or view only a portion of the BOM.

3. The system for collaborative Bill of Materials (BOM) management of claim 1, wherein the system further comprises a user update based data relationship maintenance module, which when executed by the one or more processors, automatically, based on the editing done by the first user, assesses impact of the editing and maintains data relationship across one or more sections and/or fields of the BOM based on the assessed impact.

4. The system for collaborative Bill of Materials (BOM) management of claim 1, wherein a third user edits the BOM simultaneous to the first user.

5. The system for collaborative Bill of Materials (BOM) management of claim 1, wherein the system further comprises a BOM structured database field creation module, which when executed by the one or more processors, enables at least one administrator to create the plurality of structured fields having corresponding properties for each field.

6. The system for collaborative Bill of Materials (BOM) management of claim 1, wherein the system further comprises a user rights association module, which when executed by the one or more processors, enables an administrator to assign rights to one or more users for editing or viewing of one or more sections of the BOM, or for editing or viewing of at least one field of the BOM.

7. The system for collaborative Bill of Materials (BOM) management of claim 1, further comprising a user activity history management module, which when executed by the one or more processors, manages user-level history of actions performed on the BOM by each user of the BOM.

8. A multi-user collaborative Bill of Materials (BOM) management system comprising:

at least one remote database;

at least one remote processing server, having at least one processor and at least one non-transitory computer-readable medium containing at least one executable set of computer instructions capable of generating a plurality of user profiles;

wherein the at least one remote database and the at least one remote processing server are connected via a network, a plurality of user interface ports, each accessible by at least one of the plurality of user profiles, and wherein the interface ports communicate with the at least one remote processing server via the network; a user-managed bill of materials having a plurality of fields, the user-managed bill of materials being generated by the at least one remote processing server based on input from a first user profile and a set of structural rules contained at least partially on the at least one non-transitory computer-readable medium of the at least one remote processing server; a multi-level relationships module, wherein the collaborative BOM is comprised of multiple levels and the multi-level relationships module is configured to identify and maintain relationships between each of the various levels; and a component relationship management module, configured to manage a relationship of each component to its usage and manage a relationship of each component with respect to products, assemblies, and sub-assemblies, which can be displayed in a graph, wherein each of the fields of the user-managed bill of materials has a user-selected property associated therewith, wherein the properties associated with each field in part determine a location on the at least one remote database for storing information associated with each field, and wherein the information associated with each field of the user-managed bill of material is configured to be edited by multiple user profiles simultaneously.

9. The multi-user collaborative Bill of Materials management system of claim 8, further comprising highlighted fields, wherein the highlighted fields are indicative of a particular user profile that is either viewing or editing a particular highlighted field and wherein each user profile has a different highlighting color associated therewith.

10. The multi-user collaborative Bill of Materials management system of claim 8, wherein the first user profile is configured to grant read/write permissions to an additional user profile for selected fields.

11. The multi-user collaborative Bill of Materials management system of claim 10, wherein the read/write permissions include additive permissions, which allow the additional user profile to generate additional fields in the user-managed bill of materials.

12. The multi-user collaborative Bill of Materials management system of claim 11, wherein the additional user profile permissions include controlling read/write permissions associated with any additional fields generated by the additional user profile.

13. The multi-user collaborative Bill of Materials management system of claim 10, where any user profile having read/write permissions can save an immutable revision of the user-managed bill of materials.

14. The multi-user collaborative Bill of Materials management system of claim 13, wherein any user profile having read permissions can view a history of changes between revisions.

15. The multi-user collaborative Bill of Materials management system of claim 13, wherein any properties or information associated with the fields of the user-managed bill of materials of a given revision are unalterable.

16. The multi-user collaborative Bill of Materials management system of claim 13, wherein one of the fields contains information associated with a second user-managed bill of materials and wherein the immutable revision preserves the information associated with the second user-managed bill of materials at a moment of saving.

17. The multi-user collaborative Bill of Materials management system of claim 13, wherein one of the fields contains information associated with a second user-managed bill of materials and wherein the immutable revision preserves the information associated with the second user-managed bill of materials at a moment of saving.

18. The multi-user collaborative Bill of Materials management system of claim 13, wherein one of the fields contains information associated with a revision controlled item and wherein the immutable revision preserves the Information associated with the revision controlled item at a moment of saving.

19. The multi-user collaborative Bill of Materials management system of claim 13, wherein one of the fields contains information associated with a revision controlled item and wherein the immutable revision allows the information associated with the revision.

\* \* \* \* \*